United States Patent
Rattan et al.

(10) Patent No.: US 10,949,555 B2
(45) Date of Patent: Mar. 16, 2021

(54) ENCRYPTION AND DECRYPTION SYSTEM AND METHOD

(71) Applicant: Exate Technology Limited, Ickenham Middlesex (GB)

(72) Inventors: Sonal Rattan, Ickenham Middlesex (GB); Peter Lancos, Ickenham Middlesex (GB); Suraj Nittoor, Ickenham Middlesex (GB)

(73) Assignee: Exate Technology Limited, Ickenham Middlesex (GB)

( * ) Notice: Subject to any disclaimer, the term of this patent is extended or adjusted under 35 U.S.C. 154(b) by 350 days.

(21) Appl. No.: 15/576,229

(22) PCT Filed: May 23, 2016

(86) PCT No.: PCT/GB2016/051485
§ 371 (c)(1),
(2) Date: Nov. 21, 2017

(87) PCT Pub. No.: WO2016/189293
PCT Pub. Date: Dec. 1, 2016

(65) Prior Publication Data
US 2018/0144148 A1   May 24, 2018

Related U.S. Application Data

(60) Provisional application No. 62/169,704, filed on Jun. 2, 2015.

(30) Foreign Application Priority Data

May 22, 2015  (GB) .................................... 1508872

(51) Int. Cl.
*G06F 21/62* (2013.01)
*H04L 9/08* (2006.01)
(Continued)

(52) U.S. Cl.
CPC ........ *G06F 21/6209* (2013.01); *G06F 21/602* (2013.01); *G06F 21/6245* (2013.01);
(Continued)

(58) Field of Classification Search
CPC ............... G06F 21/6209; G06F 21/602; G06F 21/6245; G06F 2221/2111;
(Continued)

(56) References Cited

U.S. PATENT DOCUMENTS 6,289,450 B1 *  9/2001  Pensak ................ H04L 63/0428
                                                   713/167
2009/0154693 A1 *  6/2009  Nakamura ................ H04L 9/06
                                                   380/30
(Continued)

OTHER PUBLICATIONS

International Search Report and Written Opinion for PCT/GB2016/051485 dated Sep. 14, 2016.
(Continued)

*Primary Examiner* — Mohammad W Reza
(74) *Attorney, Agent, or Firm* — Carmen C. Cook

(57) ABSTRACT

A system and method for encryption and decryption of data is disclosed. The decryption system provides access to remotely stored data items, each of the data items being independently accessible. At least a subset of the remotely stored data items are encrypted and each encrypted data item has an associated access condition. Upon a client requesting access to a remotely stored data item, the decryption system is arranged provide non-encrypted data items and for encrypted data items provide a decrypted data item if the associated access condition is met.

18 Claims, 4 Drawing Sheets

(51) Int. Cl.
  *H04L 9/32* (2006.01)
  *G06F 21/60* (2013.01)
(52) U.S. Cl.
  CPC ............ *H04L 9/0894* (2013.01); *H04L 9/321* (2013.01); *G06F 2221/2111* (2013.01); *G06F 2221/2115* (2013.01); *H04L 2209/60* (2013.01)
(58) Field of Classification Search
  CPC ............ G06F 2221/2115; H04L 9/321; H04L 9/0894; H04L 2209/60
  USPC ........................................................ 713/193
  See application file for complete search history.

(56) References Cited

U.S. PATENT DOCUMENTS

2010/0027797 A1\* 2/2010 Nakamura ....... G11B 20/00086
  380/277
2010/0257351 A1 10/2010 O'Connor et al.

OTHER PUBLICATIONS

"Metadata Repository Contents", Wikipedia, May 21, 2015, p. 1-4, XP055300307, Retrieved from the Internet:URL: https://web.archive.org/web/20150521233805/http://en.wikipedia.org/wiki/Metadata repository (Retreived on Sep. 6, 2016).

\* cited by examiner

ENCRYPTION AND DECRYPTION SYSTEM AND METHOD

CROSS-REFERENCE TO RELATED APPLICATIONS

This application is a U.S. National Stage Application under 35 U.S.C. § 371 of International Patent Application No. PCT/GB2016/051485, filed May 23, 2016 which claims priority to Great Britain Application No. 1508872.7, filed May 22, 2015, and claims benefit of U.S. Provisional Application 62/169,704, filed Jun. 2, 2015, which are hereby incorporated by reference in their respective entireties.

FIELD OF THE INVENTION

The present invention relates to an encryption and decryption system and method that are particularly suitable for flexible protection of assets.

BACKGROUND TO THE INVENTION

There have always been concerns surrounding access of content of assets such as documents and communications. As assets have become predominantly electronic and mostly stored remotely of the user such as "in the cloud", this is becoming an increasing concern.

Encryption is sometimes desired (for example a person may wish to ensure his or her credit card number is not transmitted in a form that could be intercepted and used). In other situations, encryption may be mandated by an organisation or government. For example, some countries privacy laws require personnel records and the like to be encrypted.

There are many encryption mechanisms available. These vary in terms of factors such as the key types used (such as symmetric and asymmetric encryption), how keys are exchanged, encryption cipher and complexity. A particularly common form of encryption used on the internet is the PKI (Public Key Infrastructure) system. This can be based on different ciphers but typically uses AES (Advanced Encryption Standard) 128 or 256 bit encryption.

Encryption techniques can be mathematically intensive and must, above all, be trustable. A user will not entrust his or her data to a system that uses encryption that can be bypassed or defeated.

It is typical for a website or application developer to interface with an encryption/decryption system such that an asset (such as a document/communication to be encrypted or decrypted) is passed to the interface which is left to deal with encryption/decryption in its entirety. The interface typically passes the document/communication onwards to local or remote components that do the encryption or decryption. For example, the interface may be a link to a remote system or it may be an Application Programming Interface (API) that defines published functions that can be called upon by the program. In the case of an API, it is typically the interface to a locally stored library of functions although it may still call on remote systems and resources.

Often, an encryption system is treated as a layer in a communication stack—the communication/document is passed to the interface which encrypts it before passing it to the next layer in the stack. In the case of storage, the document/communication may not be decrypted at the destination. In the case of a communication system, a counterpart interface will decrypt the document or communication as it is being received and output a non-decrypted version for consumption at the recipient system. It is common (and generally considered desirable) that this process is transparent to the user and application/web developer.

STATEMENT OF INVENTION

According to an aspect of the present invention, there is provided an encryption system arranged to receive, for each of a plurality of data fields, content of the data field and a designation of encryption type, the encryption system being arranged to apply the encryption type to the content of the respective data field and associate metadata on the encryption type with the encrypted content.

Preferred embodiments of the present invention seek to enable user defined encryption—where the user is a developer or the user of the system (if application permits)

According to another aspect of the present invention, there is provided a decryption system for providing access to remotely stored data items, each of the data items being independently accessible, wherein at least a subset of the remotely stored data items are encrypted and each encrypted data item has an associated access condition, upon a client requesting access to a remotely stored data item, the decryption system being arranged provide non-encrypted data items and for encrypted data items provide a decrypted data item if the associated access condition is met.

For the purpose of embodiments of the present invention, any encryption system and cipher could be used.

Embodiments of the present invention allow assets such as data fields to be individually stored and retrieved from storage in such a way that some can be encrypted and some may not. Different encryption schemes/types can be applied to different assets. Optionally, access conditions can be associated with assets (and different conditions associated with different assets). For example, a user interface may have certain fields (such as credit card number) that are encrypted and others that are not. Some fields may specify that only certain users or users at a certain PC or in a certain country may access them.

Preferably, access to the storage and assets is consistent irrespective of whether encryption is applied or the type of encryption applied. A common API may be provided that allows access but which performs checks during that access to determine if the accessing client has the appropriate permissions on a per asset/data field basis.

When a client requests data fields to populate a web page, for example, only those fields for which the associated access condition is met will preferably be returned. In the case of country specific access provisions, it may be that a multi-national company may have operatives in one country that can access all data but operatives in other countries that can only see a subset of that data—the same application/user interface could be provided to all operatives and they would be accessing the same data source but only those meeting the access condition would see the relevant data.

BRIEF DESCRIPTION OF THE DRAWINGS

Embodiments of the present invention will now be described, by way of example only, with reference to the accompanying drawings in which.

DETAILED DESCRIPTION

Figure 1:
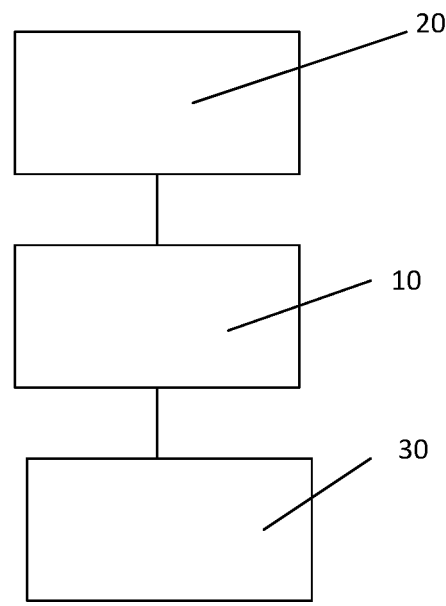
FIG. 1 is an encryption system according to an embodiment of the present invention.

FIG. 1 is an encryption system according to an embodiment of the present invention.

The encryption system 10 is connected to a client system 20 and a data repository 30. The encryption system 10 receives from the client system 20 content of a data field and a designation of encryption type for each of a plurality of data fields. The encryption system 10 applies the encryption type to the content of the respective data field and associates metadata on the encryption type with the encrypted content which it then stores in the data repository 30.

It will be appreciated that the encryption system 10, client system 20 and data repository 30 may all be local, some may be local to each other or they all may be remote of each other. The encryption system and data repository may be offered as a service to different client systems, for example. Client systems may be executable programs, websites, web applications, smart phone applications or indeed any other form of system. Client systems may not necessarily be end-user client systems and need not necessarily have a user interface etc. Client systems may themselves be a layer that provides access or other services to downstream client systems.

The designation of encryption type may originate from one of a number of sources. For example, it may be selected by the developer of the client system 20 (or of some system the client system 20 uses) and be embedded, for example, as part of code or scripts executed, interpreted or otherwise used in executing the client system 20. For example, the designation of encryption type may be included in metadata that is used for forwarded to the encryption system 10 with the respective data field content.

The metadata may, for example, be it will be an enumerated data type that includes data, to determine what type of decryption function should be used. For example it may indicate hybrid (combination of cryptography, salt and symmetric key), symmetric_1024, symmetric_128 etc.

In another example, designation of encryption type may be offered to the end user (or operator of the system such as store owner etc). A default designation of encryption type may be set but may be changeable within a user interface (and may optionally be stored in a profile for the particular user so that certain data or data types may be consistently treated in the same way).

Figure 2:
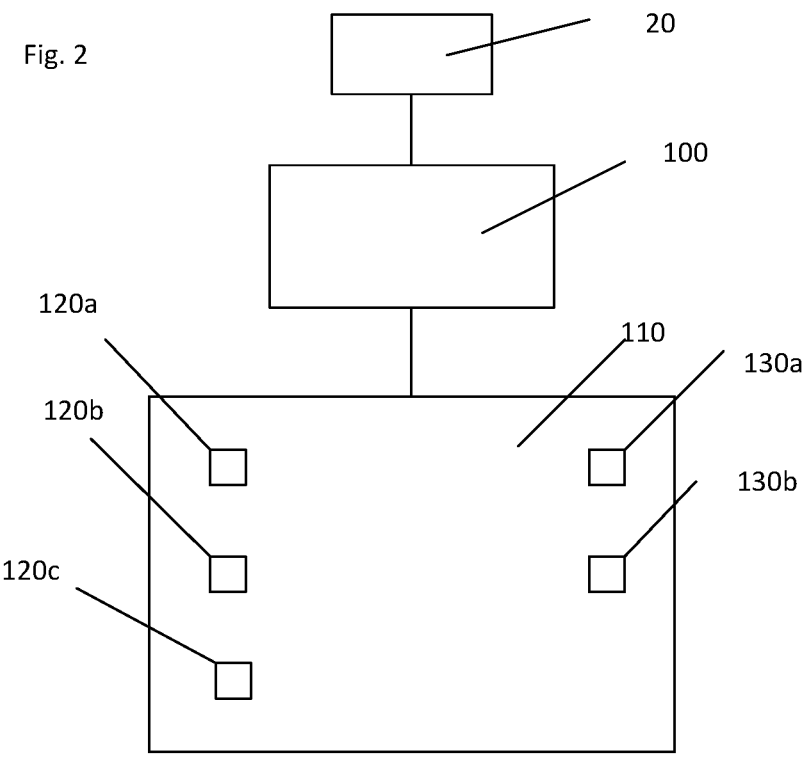
FIG. 2 is a decryption system according to another embodiment of the present invention.

FIG. 2 is a decryption system according to another embodiment of the present invention.

The decryption system 100 (which may be part of the encryption 10) provides access to remotely stored data items 120a-c stored in a data repository 110 (which may be the same data repository 30 as that in FIG. 1). Each of the data items is independently accessible (so a client system 20 could request any or all data items either sequentially or all at once). Some of the data items (120a, 120b) are encrypted. Each encrypted data item 120a, 120b has an associated access condition 130a, 130b. Upon a client system 20 requesting access to a remotely stored data items 120a and 120c, the decryption system 100 provides the non-encrypted data item 120c. If the associated access condition 130a is met, the decryption system 100 provides a decrypted version of the requested encrypted data item 120a (the decryption system may do the decryption or it may involve another system to do this, likewise it may have or retrieve the decryption keys or may have involve another system (possibly even the client system) for this).

It will be appreciated that the system of FIG. 1 could be used to populate a data repository for access by the decryption system of FIG. 2. However, it is not essential that this is the case—it may be that a different system or mechanism is used to populate and/or maintain the data repository.

Embodiments of the present invention seek to provide selective attribute level encryption. This can be set by either the developer or the owner of the data and may use multiple user, system or predefined decryption keys. The developer would decide on an attribute by attribute (for example field by field in the case of data being entered into a user interface) basis if they will set the fields which will be encrypted (and the level of encryption), or if they will incorporate a drop down box next to each attribute in order to allow the user to select the fields that they wish to encrypt and the level of encryption.

Embodiments of the present invention may be implemented in many ways—for example they may be provided via an API or other library or function that is separate or embedded within a system or operating system, it may be via a remote service or it may be via a shell such as a web browser shell that acts as a wrapper to a user interface and communications and handles the necessary encryption and decryption for those web pages in which attributes have designated encryption settings (in this embodiment, the settings can be part of a page's source code and implemented when the page is being rendered by the browser—those browsers without the shell will ignore the settings which may mean, for example, that they cannot provide access to encrypted attributes (the presence of the browser shell could be one of the access conditions)).

Preferably, data is stored in a manner consistent with the user based encryption level set by either the developer or the user. If the user defines one attribute as public, one attribute as 256 bit encryption and one attribute as 1024 bit encryption, the data will both be transmitted and stored in the database using those standards. When stored data is to be utilised by another application or system or where the encryption type is not predefined or readily identifiable, metadata is preferably associated with each encrypted attribute. If there is no metadata, then the system preferably assumes that the data is public information and the attribute can be immediately consumed. When metadata on an encrypted attribute is encountered, the system will be allowed to decrypt the data if the user provides an authorised key or satisfies access conditions necessary for a key to be made available. Otherwise, it will be blocked from accessing the encrypted data. There may optionally be a system arranged to monitor for unauthorised or failed attempts to decrypt the data.

One type of access condition may be a country level restriction. Data may be obtained on the client system and location, which is used with the metadata described above, to determine if access will be granted. Access to data may be blocked if the person is travelling, as the data can only be accessed within a specific country. In order for a person in a country to view the data, they will require both the correct system and location parameters, before the decryption keys are released.

It will be appreciated that access conditions can be more granular and could, for example, be based on access by a certain network address/address range, by a certain computer system or a system having certain properties etc.

In a preferred embodiment, an access condition may be that the owner is online. A data owner links a specific attribute to a specific individual. For example, a data owner may be the person who entered the data attribute. The data attribute input person may or may not be the person who owns the encryption keys. This is defined by the application. By default the owner of the encryption keys is the person inputting the data. However, in certain cases the owner may be updated by the application (e.g. for a know your client application, the person collecting the information around a client will be performing this service on behalf of a client and the client will be the owner of their data).

Checking that an owner is online may preferably be performed by use of a heartbeat signal from a client system 20 to the encryption system 10. If the heartbeat is received within a predetermined time window then the client system (and the owner associated with it) is deemed online. Preferably, the client system 20 via which the owner inputted the data is the one which must provide the heartbeat in order for the owner to be deemed online.

Another access condition may be that data items are accessed via a secure browser shell such as that discussed below.

Another access condition may be the person, company or other defined group granted access.

One embodiment of a decryption system includes a secure browser shell for providing an attribute level of encryption per country. The owner of the data sets the level of security required around each data attribute (either by the developer at coding/design time of the web page or by providing options for the user to select via the user interface) and, based upon this, can define the level of encryption per attribute. Data that is entered into the browser shell is encrypted based on attribute settings and remains encrypted when written to a data store such as a database. Data can only be decrypted and viewed locally by a user within a secure browser shell, based upon rights and a decryption key granted by the owner of the data. Biometric or other verification can also be included as a pre-requisite for decryption. Although retrieved data may be shown to a user in a decrypted form if they meet the access conditions, any modifications made within the secure browser shell will be encrypted before being written to the data store.

Example 1

The following example uses a cross border transfer of sensitive corporate data as an illustration. However, the data transfer can be within a single country, or between individuals. Embodiments relate to the manner in which secure data is transferred between two or more entities.

In this example, the data is stored, but not visible, in Country 1. It is permissioned for viewing in Country 2, but only for Company 1. The data owner sets the attribute level entitlements around encryption and viewing rights. This enables the data to be stored in one country and viewed as entitled in a second country, thereby removing the need to replicate systems and infrastructure in countries with strict data privacy rules. In a preferred embodiment, one or more further data repositories may be used for key storage and/or rules for key access. The one or more further data repositories can, advantageously, be situated remotely of the location in which the data is stored. In this way, the system will allow, for example, for the key storage and/or rules for key access to remain in a key data store within the country where the restrictions apply.

In such an example, data may be stored in a central data store in one location (or may be mirrored or otherwise distributed according to corporate data security and backup policies). For example, the data may be stored in USA. Certain data fields may be subject of data protection and deemed not to be viewable outside of a jurisdiction (for example Germany or perhaps a region such as the EU). In such a scenario, when communicated to the system, the data fields are labelled with appropriate metadata. A user satisfying location checks when requesting access will be permitted access to the data fields in order for them to be decrypted. Another user (for example a US based IT administrator) will be able to deal with the encrypted data for backups etc but will not meet the access requirements so will not be permitted access to the data.

Example 2

In the second example, an on-line retailer wishes to allow its customers to incorporate an additional layer of security around their credit card details, following a data attack whereby details were stolen. The Retail Customer can determine the level of security that they want around their personal details (with potential recommended settings provided by the Retailer). The data elements are transmitted to and stored by the Retailer using the Retail Customer defined encryption levels at all times.

In a preferred embodiment, data elements can only be viewed by the Retailer in a Secure Browser Shell (SBS), an extension to a web browser that handles communication with the encryption and/or decryption system. In the event of a data attack on the Retailers database, the hacker would only get encrypted data. The transmission to the Credit Card Company would preferably be made using an associated Library, which decrypts the credit card information using the Retail Customer key and immediately re-encrypts the credit card details with Retailer encryption key. This encrypted data will preferably be transmitted to Credit Card Company using the existing transmission methods. Through the use of the library, this transmission of data between the Retailer and the Credit Card Company can be fully automated and secure per the attribute encryption levels set by the Retail Customer.

Example 3

In the third example, a company is concerned over cyber-attacks, including computer based malware, and having certain information or information types (which may be financial statements, new product designs, corporate strategy, etc.) compromised by third parties. They are therefore looking to utilize an on-line tool for sharing highly classified documents and/or pictures. In this instance, User 1, as the File owner, has selected 1024 bit encryption for a specific file. Decryption keys have been shared with User 2 and User 3. User 4, who may be an unentitled employee or a third party looking to compromise the file by attempting to access the document through the Secure Browser Shell and/or the transmission, cannot unencrypt the file, as they do not have a decryption key. Depending on the sensitivity of the document, the owner of the file can establish an appropriate level of encryption and access conditions. For example, one access condition may require access only via a secure browser shell. Following decryption, the file would only be viewed in such a Secure Browser Shell.

Examples of encryption and decryption routines are set out below, although it will be appreciated that other routines or orders of execution may be used.

Example 4

By leveraging the Salt technique within cryptography, a random password can be created and used when encrypting the original data string of a data field. The key and password both need to be available to be able to decrypt the attribute. (This can be split and sent via two separate transmission protocols to the client for enhanced security).

For this type of encryption, the data store for keys holds both Private Key and Password. The combination is required to decrypt the original text. This embodiment can be leveraged to allow for the ability of joint/three way ownership of keys should it be required.

Use Case: Three parties may be joint owners of a particular attribute whilst allowing any combination of two owners the ability to decrypt a given attribute i.e. Employee, Firm and Regulator for an attribute such as a social security number or an escrow account etc.

Party 1 will hold a record of the Private Key in clear text and have the Password encrypted by another key owned by Party 3.

Party 2 will have the Private Key encrypted by a Key Owned by Party 3 and have the password in clear text.

Party 3 will have the Private Key encrypted with a key owned by Party 2 and the Password encrypted by a key owned by Party 1.

This allows for any combination of the two parties to recreate the key bypassing the third by granting access to their keys should it be needed in a case such as an investigation i.e. employee not agreeing to disclose his details.

| Owner | Private key | Password |
|---|---|---|
| A | Clear text key | encrypted with key owned by C |
| B | Key encrypted with key owned by C | Clear text password |
| C | encrypted with key owned by B | encrypted with key owned by A |

Example 5

The European General Data Protection Regulation represents the most significant change to data protection in the UK and EU since 1995. Embodiments of the present invention enable customers to own their own keys allows for the ability to comply with the "right to be forgotten", "right to erasure" and the "right to data portability".

A firm would be able to unsubscribe from any keys related to a person, this protects against any operation failures of data deletion or missed systems/data held in spreadsheets etc. The inability to decrypt a user's data is a precautionary measure to ensure the firm is not holding any residual information regarding a person. This is discussed in more detail with reference to FIG. 5.

Example 6

The Certification Regime implemented by the Financial Conduct Authority in the UK now requires the ability for a historical employer to provide information regarding breaches, training and complaints to future employees. The invention allows for sensitive data such as a personal scorecard to be shared with a third party when both Employer and Employer agree that data can be shared with a given third person/firm on a predefined/indefinite time period.

Example 7

With the "Owner needs to be Online" feature discussed above, items such as using saved credit card details can only be used if a user is online. This allows for the limiting when credit card details are available to decrypt (one would expect the user to be online if they are making an online transaction).

Example 8

Optionally, the key data store and key rules data store may be audited. A full audit of key access from the Key Data Store and Key Rules Data store allows the ability to track which user has viewed the data and when.

Many data companies (such as Market Data) are trying to find different ways to be able to prove data lineage and prove use (often leading to expensive investigations and inconclusive ink tests). Data is often charged per the system within which it is used. It is a difficult task to prove when and how often data is used. The audit functionality of data decryption preferably includes the application details, user (CAUI) and time. Having the individual data attributes encrypted grants third party data providers the ability to track the frequency and applications being used to decrypt the data and to use it to be able to control where the data is being used.

Figure 3:
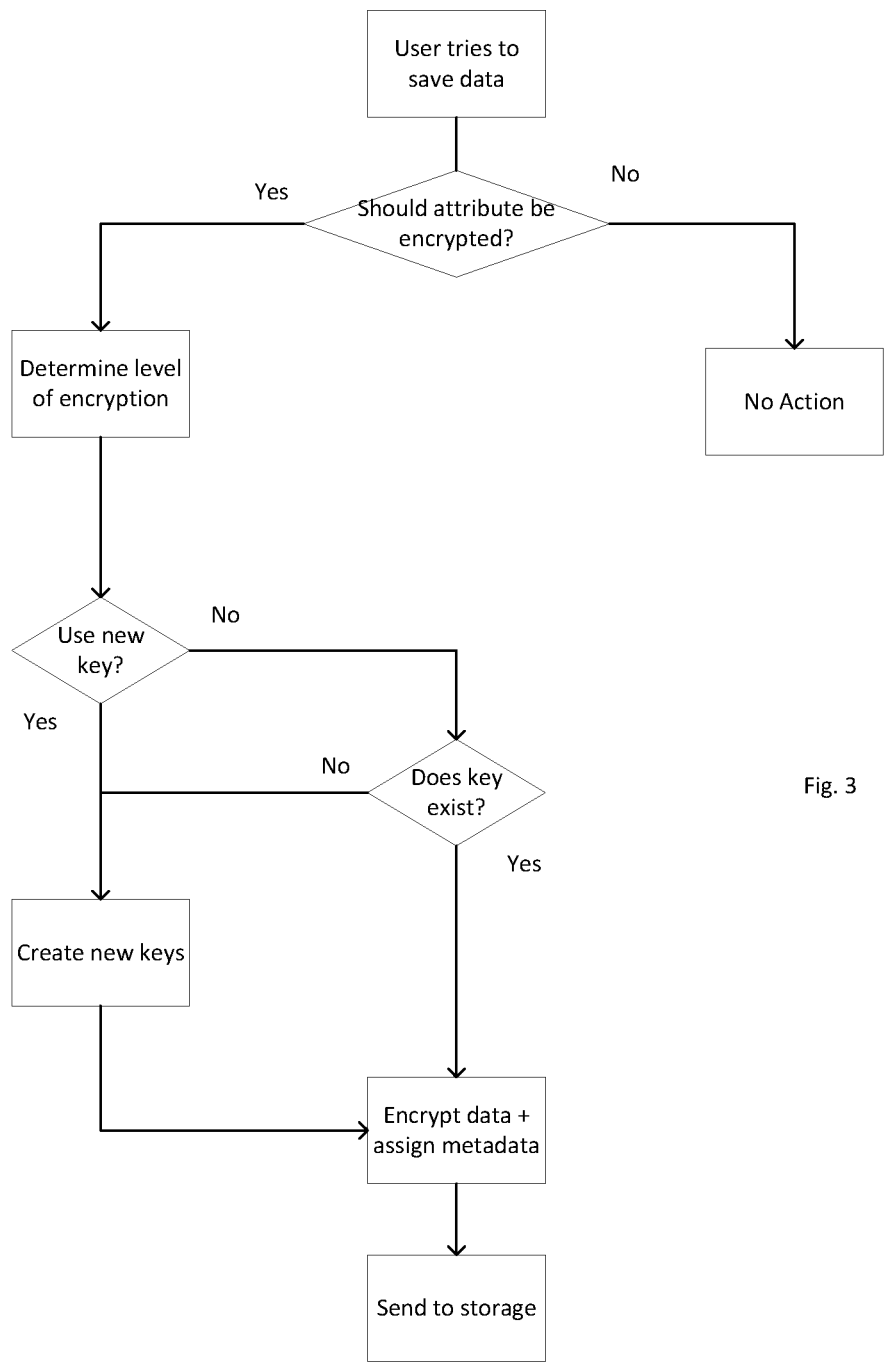
FIG. 3 is a flow diagram illustrating steps involved in encryption in a method according to an embodiment.

Encryption (FIG. 3)

The system 10 may include an application to determine if a Local or Shared private key is to be used—as long as the information about the public key info is shared with the data store (for example the data repository 30/110) used for the S-API (Server API)

A Client Machine API (CM-API) may be accessible to client systems to allow to retrieval of a list of pre-existing public keys in memory of the data repository 30/110 (or a further data repository) for a given encryption level (FIG. 1) with the corresponding Private Key Id and encryption type.

| Public Key | Encryption | Private Key Id |
|---|---|---|
| sfjb57& | 1024 | 1234 |
| jhda76eh | 256 | 4321 |
| dfdtr$%$ | 512 | 4567 |

For centrally held keys—the CM-API may obtain the private key, encryption type and public key The Private Key Id and the CAUI (Client API User Id) of the Private Key owner are preferably stored on a Data Store that the S-API can access.

For a new key. A new entry is created.

A client application makes a call to the CM-API to encrypt one (or a list of) attribute(s) to with a public key and its corresponding encryption type i.e. 1024

The API will makes a call to the S-API passing the following information

Private Key Id

The rules for the private key release defined by the Application i.e. Countries, if the CAUI needs to be online etc CAUI
  The Key Location Id, Key Id and Authorisation code for access.
At the S-API, a new record is created in the Server data store (the data repository 30/110 or a further data repository as discussed above) for the details provided and a unique MetadataTagId is assigned to that record

| MetadataId | Private Key Id | Key Location Id | Authorisation Code | List of Country Codes | Key Owner CAUI | Key Owner must be online | Biometric Verification Need |
|---|---|---|---|---|---|---|---|
| 1 | 1234 | GRM_INTERNAL | 1233-122-76 | GB\|FR | 12345 | TRUE | FALSE |
| 2 | 1234 | UK_INTERNAL | 1233-987-765 | FR | 12345 | FALSE | TRUE |
| 3 | 4567 | HK_EXATE | 875-764-98 | ALL | 12345 | FALSE | TRUE |

Figure 4:
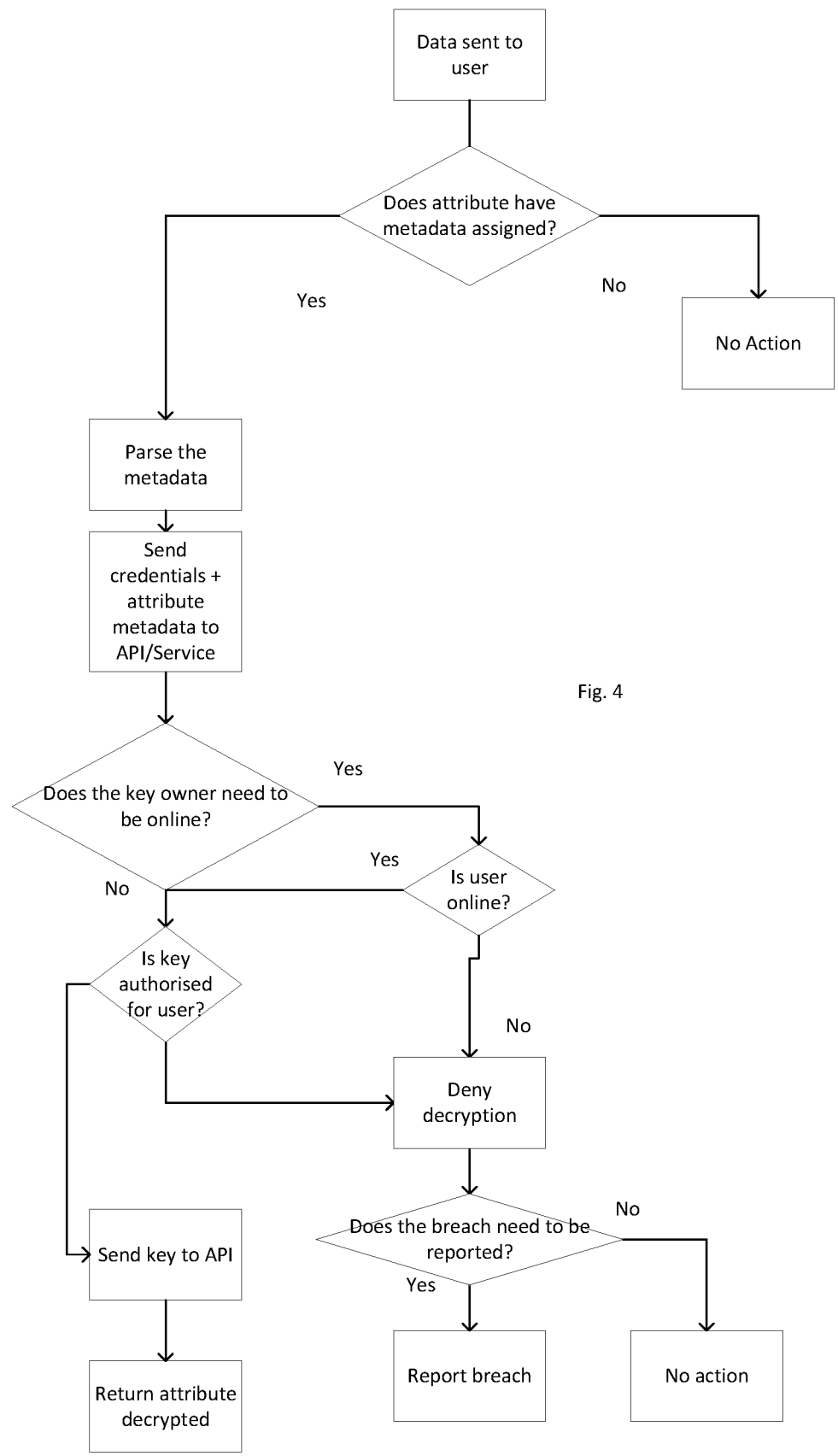
FIG. 4 is a flow diagram illustrating steps involved in decryption in a method according to an embodiment; and, FIG. 5 is a schematic diagram illustrating operation of an embodiment of a data protection system according to an embodiment of the present invention.

S-API returns the MetadataTagId to the CM-API
The CM-API then calls the corresponding method for the encryption type to encrypt the data element
The encrypting method encrypt the attribute(s) and attach the corresponding MetadataTagId to the encrypted attribute
The CM-API then returns the encrypted attribute(s) to the application
Note
  The MetadataTagId value may be encrypted within the metadata using a standard encryption mechanism key that all CM-APIs have the keys to decrypt.
Decrypting (FIG. 4)
  Client Machine API (CM API) receives a call to review and decrypt a dataset.
  This can be via the application calling data via its regular mechanism such as an AJAX call and then forwarding the data to CM-API or by using a Server data call and decrypt function
  Once the data is on the client machine, the CM-API checks if the data contains any valid metadata tags.
    The CM API will search the dataset for specific text (e.g. "<mymetadatatagId="), which indicates that there is encrypted data that needs to be decrypted
  If metadata is detected—the CM-API iterates through the data and creates a list of Id's extracted from each attribute's metadata and sends it to the Server API (S-API)
  The initialisation of the S-API may require:
    The CM APIs Unique Identifier (CAUI).
    The CM APIs Users or Firms unique Identifier.
    Country code of the CM-API Current location
    The list of MetadataTagId's
  The S-API iterates through each attributes MetadataTagId and checks if CM-APIs Unique Identifier (CAUI) can access the decrypting key.
  The next check will be if the Attribute to be decrypted has any country restriction. If so, the S-API uses the country code passed by the CM-API to check if it is in a valid country.
  The S-API performs a series of checks based upon user requirements. These may include verification of a timeframe for key sharing (key may expire after a predefined amount of time) and/or the need for the user to be active and online.
  Any additional information needed that is not passed during initialisation will be requested from the CM-API.
  If the user needs to be online (this may be a specified access condition) the S-API and the CM-API can send & receive short signals to show it is online (like a heartbeat)
  If criteria for key retrieval is met—The S-API returns the Key Location Identifier, Key Id and Authorisation code back to the CM-API
PK-API
  A private/public key can be stored in a specific country, within the same firewall as the CM API, or held on third party storage.
  PK-API attempts to connect to the key storage repository and attempts to access the decrypting key by providing the Id and Authentication Code obtained by the S-API.
  Repeated failed attempts to gain access to a given key will result in the disabling access to that key for a predefined period.
  PK-API preferably can only talk to the CM-API
  For each MetadataTagId, that the decrypting key retrieval was not permitted a null value will be returned.
CM-API
  If key is available, the CM API locates the attribute to be decrypted and uses the decryption code from the metadata to determine what method to use to decrypt the attribute
  It will then call the decryption method and will substitute the value with the decrypted text
  If the key is not available it will substitute value with application defined text (i.e 'xxxx', 'UNABLE TO DECRYPT' etc)
  The private key owner will be notified of the failed decryption attempt.

It will be appreciated that access conditions other than whether the user is online and country/location level access could be implemented including time limited access, frequency of access, biometric testing, request for additional pass codes, enhanced interrogation by requesting private key owner to verify multiple attempts of access of the private key when within a set time frame (i.e. to help combat fraudsters attempting to mimic a transaction within minutes of a genuine purchase) etc.

Embodiments of the present invention seek to enable the creation of new public/private key (although existing ones may also be used) for every attribute, allowing for completely unique decryption keys per data attribute within an element—each containing different conditions of access as well as different levels of encryption. The ability to crack one key will not compromise all of the data held within the same data store. Embodiments of the present invention also seek to allow systems to be the custodians of encrypted data without ever having the ability to decrypt.

For example, each credit card number within a vendor's data store will have a unique private key per entry—giving a much higher level of security. This data being held encrypted allows the customer to confidently save the details for future use as they are the Private Key owner in this case.

Embodiments of the present invention could absolve a vendor of having to ever hold true credit card details by ensuring the private key is only assessable to a given credit card company.

Figure 5:
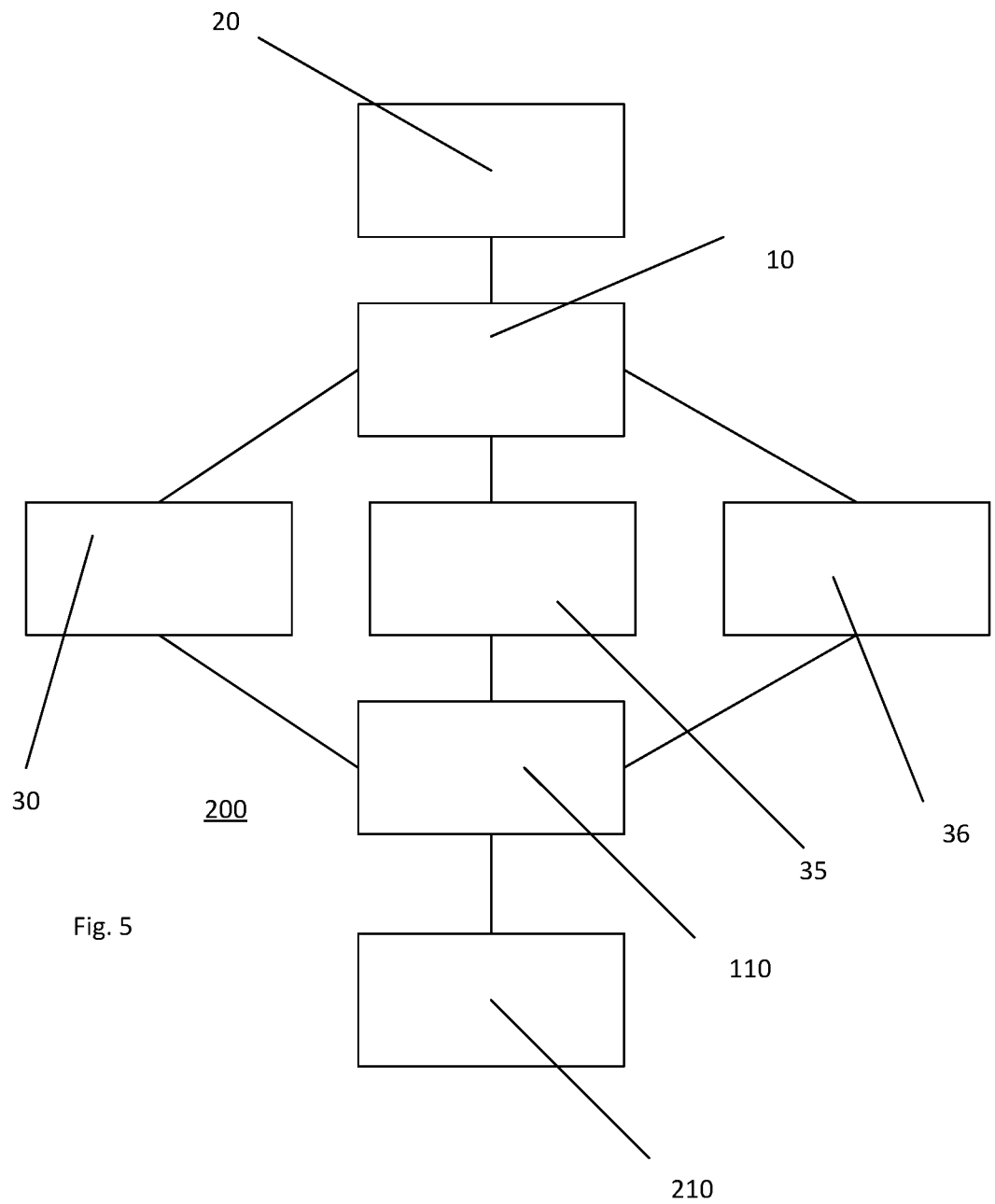

FIG. 5 is a schematic diagram illustrating operation of an embodiment of a data protection system according to an embodiment of the present invention.

In this embodiment, both encryption and decryption systems are used, although it will be appreciated that other ways of getting data to the data protection system 200 than the encryption system 10 may be used.

The encryption system 10 is connected to a client system 20 and a first data repository 30, a second data repository 35 and a third data repository 36 of the data protection system 200. The encryption system 10 receives from the client system 20 content of a data field and a designation of encryption type for each of a plurality of data fields. The designation of encryption type includes an identifier for a pre-stored key held in the third data repository 36.

The encryption system 10 applies the encryption type using the identified key from the third data repository 36 to the content of the respective data field and associates metadata on the encryption type with the encrypted content. It then stores the encrypted content 31 and metadata 32 in the first data repository 30.

The encryption system 10 also stores access conditions in a second data repository 35.

In this particular example, the first data repository may be a database of an online merchant. A user wishing to make a purchase accesses the merchant's website via a secure browser shell on the client system 20. The secure browser shell when rendering the merchant's website enables encryption of individual data fields. When the user enters her credit card number into the respective entry field and submits this, it is encrypted and written to the merchant's database 30 as described above.

Additionally, access conditions are written to the second data repository 35 which in this example is operated by a trusted service provider third party who also operates the third data repository 36 in which the encryption keys have been stored.

In this example, access conditions are:
1) The merchant may access the content of the encrypted data field
2) The user must be online
3) Only users in Germany may access the content of the encrypted data field Upon receipt of an order with the encrypted credit card number, the merchant's system 210 attempts to obtain the credit card number to make the charge. It uses the metadata 32 to communicate with the decryption system 100 which in turn obtains the access conditions from the second data repository and determines whether they are met. In this particular example, the conditions are met and the decryption system 100 obtains the relevant key to decrypt the content from the third data repository 36 before providing this to the merchant system.

If a UK office of the merchant attempted to access the encrypted data, condition 3 would fail. Location may be determined by requesting data from a geolocation system, GPS system etc. Likewise, if a heartbeat is not provided by the client system 20, condition 2 would fail. Should the user decide he no longer trusts the merchant to retain her credit card number (for example it may have been agreed it could be retained for use in future purchases), the user may rescind condition 1 at the second data repository 35.

Rescinding the condition would delete the key sharing relationship of the related person's CAUI(s) with the merchant. The ownership of the keys will remain with the user—the criteria in which it will look to access the data with be denied as the relationship to pull the keys for decryption is removed.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The invention claimed is:

1. A system comprising: a memory, and a processor coupled to the memory to execute instructions provided by the memory, the processor implementing:

an encryption system arranged to receive via a user interface, for a data subject, for each of a plurality of data fields, a data item comprising content of the data field and a designation of an encryption type selected using a user interface control associated with the respective data field, the designation being a level of encryption and being changeable via the user interface control at the time the content is entered in the user interface from a party providing the data item, the encryption system including a processor configured to execute computer program code to apply the encryption type to the content of the respective data field and associate metadata on the encryption type with the encrypted content; and a decryption system for providing access to remotely stored data items, each data item comprising content of a data field, a different data item for the data field being stored for each different data subject, each of the data items being independently accessible, wherein at least a subset of the remotely stored data items are encrypted by the encryption system, the decryption system including a data repository storing an associated access condition for each encrypted data item, each access condition specifying conditions to be met by a client requesting access to the data item for encryption key data to be accessible for decrypting the encrypted data item, the data repository being configured to receive an access condition for each of the different data subjects of a respective data item and store said access condition in the data repository whereby a data item for a first data subject have the same or a different access condition to a data item for a second data subject, the decryption system including a processor configured to execute computer program code to provide access to the data items, the computer program code being configured to cause the processor, upon a client requesting access to a remotely stored data item, to provide non-encrypted data items and for encrypted data items to retrieve the access condition for the data item from the data repository and provide access to the decrypted data item if the retrieved access condition is met.

2. The system of claim 1, wherein the decryption system further comprises a second data repository to store the encrypted content.

3. The system of claim 1, wherein the decryption system further comprises a key data store arranged to store keys for use in decrypting the encrypted data, the key data store being arranged to permit use of a stored key data upon an associated access condition or conditions being satisfied.

4. The system of claim 1, wherein an access condition comprises a physical location of the client requesting access being at a location or within a region, or at or within one of a number of predetermined locations or regions.

5. The system of a claim 1, wherein an access condition comprises the owner of the data item being determined to be online.

6. The system of claim 1, wherein an access condition comprises a designated person, group, unit organization permitted access.

7. The system of claim 1, wherein the decryption system further comprises computer program code comprising a browser shell, the browser shell being executable by a web browser of a client computer system requesting access, the browser shell being configured, when executed by a processor of the client computer system, to communicate with the decryption system and to obtain data items and to render said data items in the browser shell at the client computer system.

8. The system of claim 7, wherein the browser shell comprises computer program code is responsive to requests from said decryption system for data to establish whether an access condition associated with a requested data item is met.

9. The system of claim 1, wherein at least a subset of the data fields store content on users, the access condition for a data field being dependent on the user.

10. The system of claim 1, wherein at least a subset of the data fields store content on users and the content is provided by a party different to the users, the access condition being dependent on the party providing the content.

11. A method comprising:
an encryption method arranged to receive via a user interface, for a data subject, for each of a plurality of data fields, a data item comprising content of the data field and a designation of an encryption type selected using a user interface control associated with the respective data field, the designation being a level of encryption and being changeable via the user interface control at the time the content is entered in the user interface from a party providing the data item, the encryption method comprising:
apply the encryption type to the content of the respective data field and associate metadata on the encryption type with the encrypted content; and a decryption method for providing access to remotely stored data items, each data item comprising content of a data field, a different data item for the data field being stored for each different data subject, each of the data items being independently accessible, wherein at least a subset of the remotely stored data items are encrypted by the encryption method, the decryption method comprising:

providing a data repository storing an access condition for each encrypted data item, each access condition specifying conditions to be met for encryption key data to be accessible for decrypting the respective encrypted data item, storing, in the data repository, different access conditions for different data subjects' data item for one of the data fields;

receiving a request from a client to access one of the remotely stored data items;

upon the requested data item being non-encrypted, providing access to the data item;

upon the data item being encrypted, accessing the data repository and determining the access condition associated with the data item; and determining if the access condition is met by the client and, upon the access condition being met, providing access to the decrypted data item.

12. The method of claim 11, wherein the decryption method further comprises providing a key data store arranged to store keys for use in decrypting the encrypted data, and permitting use of a stored key data upon an associated access condition or conditions being satisfied.

13. The system of claim 1, wherein the encryption system further comprises a computer program code executable by a processor of a computer system to provide a browser shell, the browser shell being executable by a web browser of the computer system and, for a web page encoding the encryption type for a data input field, the browser shell being configured to cause the computer system to cause communication of content of the respective data input field and data on the encryption type to the encryption system.

14. The method of claim 11, wherein an access condition comprises a physical location of the client requesting access being at a location or within a region, or at or within one of a number of predetermined locations or regions.

15. The method of claim 11, wherein an access condition comprises the owner of the data item being determined to be online.

16. The method of claim 11, wherein an access condition comprises a designated person, group, unit organization permitted access.

17. The method of claim 11, wherein at least a subset of the data fields store content on users, the access condition for a data field being dependent on the user.

18. The method of claim 11, wherein at least a subset of the data fields store content on users and the content is provided by a party different to the users, the access condition being dependent on the party providing the content.

* * * * *